United States Patent
Buscicchio et al.

(10) Patent No.: US 12,429,151 B1
(45) Date of Patent: Sep. 30, 2025

(54) TELESCOPIC PIPE ASSEMBLY

(71) Applicant: Dana Motion Systems Italia S.R.L., Reggio Emilia (IT)

(72) Inventors: Luca Buscicchio, Modena (IT); Federica Franzoni, Reggio Emilia (IT); Angelo Sala, Reggio Emilia (IT)

(73) Assignee: DANA MOTION SYSTEMS ITALIA S.R.L., Reggio Emilia (IT)

( * ) Notice: Subject to any disclaimer, the term of this patent is extended or adjusted under 35 U.S.C. 154(b) by 0 days.

(21) Appl. No.: 18/618,658

(22) Filed: Mar. 27, 2024

(51) Int. Cl.
| | |
|---|---|
| F16L 27/12 | (2006.01) |
| F04B 53/16 | (2006.01) |
| F04B 53/20 | (2006.01) |
| F16B 7/10 | (2006.01) |
| F01M 11/00 | (2006.01) |

(52) U.S. Cl.
CPC ............ F16L 27/127 (2019.08); F04B 53/16 (2013.01); F04B 53/20 (2013.01); F16B 7/105 (2013.01); *F01M 2011/007* (2013.01)

(58) Field of Classification Search
CPC ..... F16L 27/12; F16L 27/127; F16L 27/1273; F16L 27/1275; F16B 7/105; F04B 53/16; F04B 53/20; F01M 2011/007; F01M 2011/0075; F01M 11/02; F16N 21/00
USPC .................................................. 285/302, 303
See application file for complete search history.

(56) References Cited

U.S. PATENT DOCUMENTS

| | | | | |
|---|---|---|---|---|
| 228,883 | A * | 6/1880 | Freeman | F16L 37/144 |
| | | | | 285/320 |
| 232,005 | A * | 9/1880 | Cook | F16L 37/144 |
| | | | | 285/404 |
| 301,900 | A * | 7/1884 | Kimble | F16L 27/12 |
| | | | | 285/302 |
| 311,871 | A * | 2/1885 | Clark | B65D 21/086 |
| | | | | 220/8 |
| 373,950 | A * | 11/1887 | Sweet | F16L 37/144 |
| | | | | 285/305 |
| 407,151 | A * | 7/1889 | Beck | F16L 37/144 |
| | | | | 403/105 |
| 653,384 | A * | 7/1900 | Grove | F16L 37/144 |
| | | | | 285/404 |

(Continued)

FOREIGN PATENT DOCUMENTS

WO  2014191714 A1  12/2014

OTHER PUBLICATIONS

"About Hydraulic Power Units," Thomas Net Website, Available Online at https://www.thomasnet.com/articles/electrical-power-generation/hydraulic-power-units/, Aug. 3, 2022, 8 pages.

*Primary Examiner* — David Bochna
(74) *Attorney, Agent, or Firm* — McCoy Russell LLP

(57) ABSTRACT

Telescopic pipe assembly for a hydraulic power unit. The telescopic pipe assembly includes, in one example, a first pipe including multiple indents or recesses that are positioned along a portion of the first pipe and a second pipe including an alignment opening, where the first pipe is axially moveable in relation to the second pipe and where the alignment opening is configured to align with each of the multiple indents or recesses in multiple axial positions. The telescopic pipe assembly further includes an attachment device configured to extend through the alignment opening and user-selectably mate with one of the multiple indents or recesses to fix an axial position of the first pipe in relation to the second pipe.

14 Claims, 8 Drawing Sheets

(56) References Cited

U.S. PATENT DOCUMENTS

| | | | | |
|---|---|---|---|---|
| 1,209,008 | A | * | 12/1916 | Messina .................. F16L 37/144 |
| | | | | 285/317 |
| 1,369,239 | A | * | 2/1921 | Gulick .................... F01M 11/00 |
| | | | | 184/6.24 |
| 1,549,001 | A | * | 8/1925 | Hisey ...................... F16L 37/12 |
| | | | | 285/320 |
| 3,217,941 | A | | 11/1965 | Fishburne |
| 3,298,458 | A | | 1/1967 | Deremer |
| 3,317,144 | A | * | 5/1967 | Muschett ................ B05B 15/74 |
| | | | | 285/302 |
| 3,592,293 | A | * | 7/1971 | Frincke ................ F01M 11/065 |
| | | | | 123/196 R |
| 5,386,881 | A | * | 2/1995 | Eshelman ............... F01M 11/04 |
| | | | | 222/529 |
| 5,988,134 | A | * | 11/1999 | Smietanski ........ F01M 11/0004 |
| | | | | 123/196 R |
| 6,363,905 | B1 | * | 4/2002 | Davis .................... F01M 11/04 |
| | | | | 123/196 R |
| 6,776,262 | B2 | * | 8/2004 | Hur ...................... F01M 11/064 |
| | | | | 123/196 R |
| 7,445,251 | B2 | * | 11/2008 | Nilsen .................. F16L 13/143 |
| | | | | 411/383 |
| 8,234,726 | B2 | | 8/2012 | Shafik |
| 9,702,489 | B2 | | 7/2017 | Yamamoto |
| 9,797,534 | B2 | | 10/2017 | Ho et al. |
| 10,413,791 | B2 | | 9/2019 | Moore |
| 2015/0253006 | A1 | * | 9/2015 | Grace .................... F23B 90/08 |
| | | | | 126/307 R |
| 2017/0343142 | A1 | | 11/2017 | Kim |
| 2017/0370336 | A1 | * | 12/2017 | Pinault ................ F01M 11/064 |
| 2019/0009865 | A1 | | 1/2019 | Le Devehat et al. |
| 2023/0063067 | A1 | | 3/2023 | Lin |

\* cited by examiner

TELESCOPIC PIPE ASSEMBLY

TECHNICAL FIELD

The present description relates generally to a telescopic pipe assembly in a hydraulic power unit.

BACKGROUND AND SUMMARY

Hydraulic power units are used in a variety of hydraulic systems to drive hydraulic components. Hydraulic power units are used in vehicles such as construction vehicles, construction equipment, manufacturing machinery, loading dock machinery, and other fields. The hydraulic power units include hydraulic tanks which are connected to hydraulic pumps using suction pipes.

U.S. Pat. No. 3,217,941 A to Fishburne discloses a hydraulic power unit with flexible pipes that provide a hydraulic connection between a tank and multiple pumps. The pumps are specifically designed as rotary pumps which are directly connected to a motor.

The inventors have recognized several issues with Fishburne's hydraulic power unit and other conventional hydraulic power units. For instance, the flexible pipes may be susceptible to degradation during manufacturing, servicing, and repair, for instance. Altering the length of the flexible pipes may be difficult and demand specialized tools. The flexible pipes may generate undesirable line losses in relation to other types of pipes. Other hydraulic power units have included fixed length pipes, thereby constraining the pipe's applicability.

The inventors have recognized the aforementioned challenges and developed a telescopic pipe assembly in a hydraulic power unit to at least partially address the challenges. The telescopic pipe assembly includes a first pipe with multiple indents or recesses that are positioned along a portion of the first pipe. The telescopic pipe assembly further includes a second pipe with an alignment opening. In the pipe assembly, the first pipe is axially moveable in relation to the second pipe and the alignment opening is configured to align with each of the multiple indents or recesses in multiple axial positions. The telescopic pipe assembly further includes an attachment device configured to extend through the alignment opening and user-selectably mate with one of the indents or recesses to fix an axial position of the first pipe in relation to the second pipe. In this way, the telescopic pipe assembly is designed to be efficiently reconfigured to fit hydraulic power units with different dimensions, thereby increasing the pipe assembly's applicability.

In yet another example, the telescopic pipe assembly may include a seal that is positioned at an interface between the first pipe and the second pipe. In this way, the pipe assembly is able to be effectively sealed with a decreased likelihood of leakage.

Further, in one example, the attachment device is a screw that threadingly engages threads which circumferentially surround the alignment opening. In this way, the position of the first and second pipes is able to be securely but temporarily fixed.

In another example, the attachment device may be a hooked apparatus. In such an example, the hooked apparatus includes an extension that mates with the alignment opening in the second pipe and the multiple indents or recesses in the first pipe. The hooked apparatus further includes a support member that is directly coupled to the extension and a base which is coupled to the second pipe. The hooked apparatus allows the relative position of the first and second pipes to be quickly adjusted and securely fixed with regard to one another, subsequent to the adjustment. In this way, the pipe assembly may be efficiently adjusted and securely fixed at a desired length.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A telescopic suction pipe assembly which achieves increased adaptability for a wide variety of hydraulic power units with different geometries is described herein. To achieve this increased adaptability, the pipe assembly includes a first pipe (e.g., a fitting) that is mated with a second pipe (e.g., an outer pipe) which is axially slideable in relation to the first pipe. The first pipe includes multiple indents or recesses and the second pipe includes an alignment opening which is profiled to receive an attachment device (e.g., a screw or a hook). To adjust pipe assembly length, the user first aligns one of the multiple indents in the first pipe with the alignment opening in the second pipe which achieves a desired pipe assembly length. Next the attachment device is mated with the selected indent or recess and the alignment opening to fix the length of the pipe assembly. In this way, the pipe assembly is able to be fixed at different discrete lengths. Consequently, the telescopic suction pipe assembly is capable of being used in a larger variety of hydraulic power units which have different distances between a tank outlet and a pump inlet, thereby increasing customer appeal.

Figure 1:
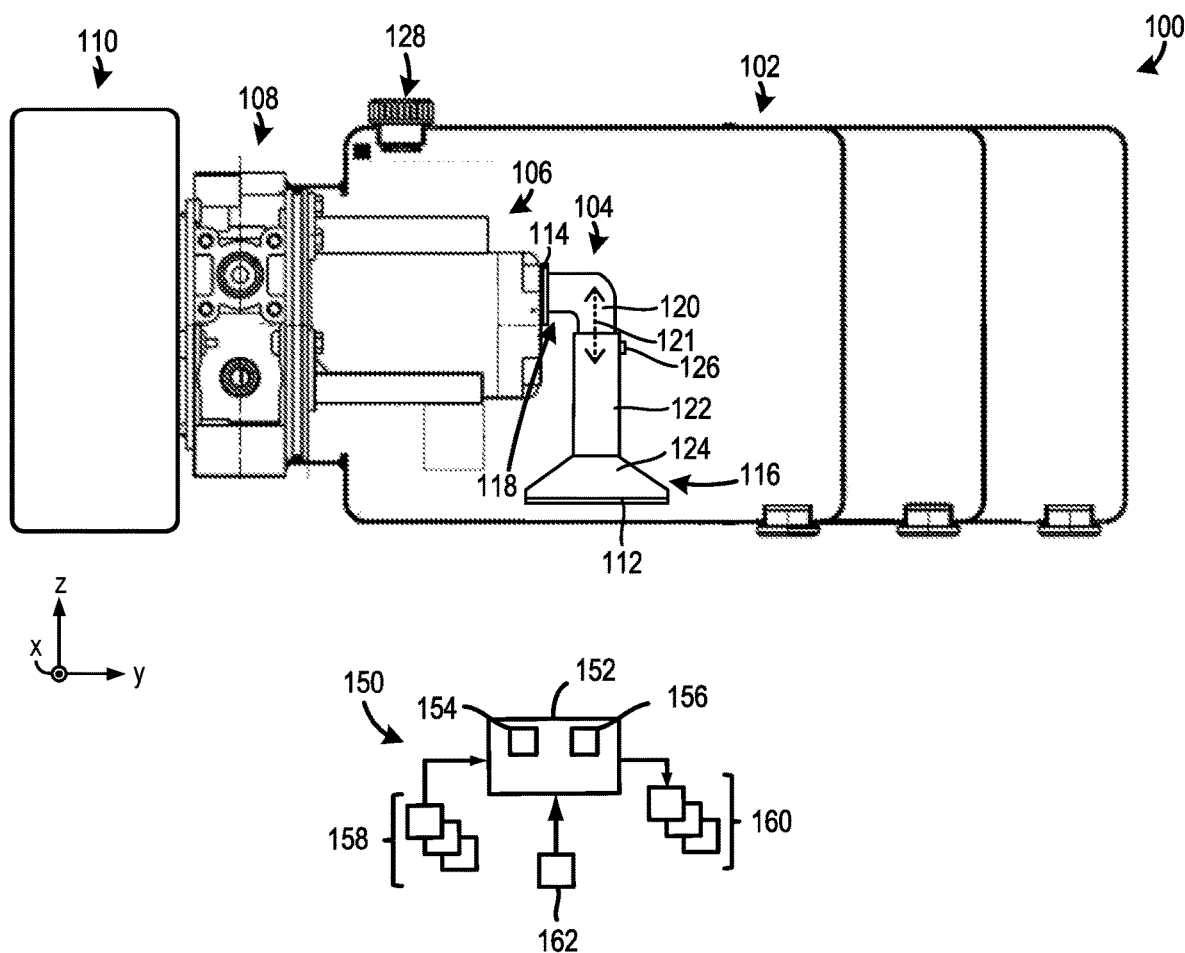
FIG. 1 is an illustration of an example of a hydraulic power unit with a telescopic pipe assembly.

FIG. 1 shows an example of a hydraulic power unit 100 with a fluid tank 102, a telescopic pipe assembly 104 (e.g., a hydraulic suction pipe assembly), a pump 106, a manifold 108, and an electric motor 110. The working fluid in the hydraulic power unit 100 may be oil, in one example. However, alternate suitable working fluids may be used in the hydraulic power unit, in other examples.

The telescopic pipe assembly 104 is configured to deliver fluid from an outlet 112 of the tank 102 to an inlet 114 of the pump 106. The telescopic pipe assembly is designed to alter the position between an inlet 116 of the pipe assembly and an outlet 118 of the pipe assembly. In this way, the telescopic pipe assembly is able to be adapted for hydraulic power units with different pump and/or tank dimensions. Therefore, it will be understood that the hydraulic power unit 100 depicted in FIG. 1 embodies one of multiple power units in which the telescopic pipe assembly 104 may be incorporated. As such, the pipe assembly has wide applicability due to its adaptability, thereby increasing customer appeal.

These telescopic pipe assemblies may be included in the hydraulic power unit 100 depicted in FIG. 1. However, when the straight telescopic pipe assemblies are used in the hydraulic power unit 100 depicted in FIG. 1 the relative positon of the pump inlet 114 and/or the tank outlet 112 may be altered such that they are in an in-line orientation.

The tank 102 stores the working fluid in the unit which may be oil, as indicated above. From the tank 102 the working fluid travels through the telescopic pipe assembly 104 to the pump 106. From the pump 106, fluid may travel through valves in the manifold 108. In one example, the manifold 108 may include a relief valve which functions to set the maximum pressure of the system, in some instances. The manifold 108 may further include one or more valves configured to control an external actuator which may be a linear actuator (e.g., a cylindrical actuator) and/or a rotary actuator (e.g., a motor). A hydraulic circuit of the system, with the exception of the actuator, may be included in the manifold, in one example. Additionally, the pump 106 is rotationally coupled to the electric motor 110.

The manifold 108 has the pump 106 and the motor 110 mounted thereon, in the illustrated example. However, other manifold configurations have been contemplated. The telescopic pipe assembly 104 includes a first pipe 120 (e.g., a fitting) which is axially moveable along an axis 121 in relation to a second pipe 122 or vice versa. To elaborate, the first pipe 120 mates with the second pipe 122, in the illustrated example. The telescopic pipe assembly 104 further includes a filter 124. The pipe assembly 104 further includes an attachment device 126 that is configured to fix the relative position of the first pipe 120 and the second pipe 122 after a desired length has been achieved by moving the pipes along the axis 121 in relation to one another. Detailed examples of different telescopic pipe assemblies are shown in FIGS. 2-14 and discussed in greater detail herein. Therefore, the function and structure of the telescopic pipe assembly is expanded upon herein. Further, the tank 102 includes a filler cap 128 in the illustrated example. However, other tank configurations are possible.

As shown in FIG. 1, a control system 150 with a controller 152 may be electrically coupled to the hydraulic power unit 100. The controller 152 may include a microcomputer with components such as a processor 154 (e.g., a microprocessor unit), input/output ports, an electronic storage medium 156 for executable programs and calibration values, e.g., a read-only memory chip, random access memory, keep alive memory, a data bus, and the like. The storage medium may be programmed with computer readable data representing instructions which are executable by a processor for performing the methods, control techniques, and the like described herein as well as other variants that are anticipated but not specifically listed. Therefore, the electronic storage medium 156 may hold instructions stored therein that when executed by the processor 154 cause the controller 152 to perform the various method steps described herein.

The controller 152 may receive various signals from sensors 158 coupled to different regions of the hydraulic power unit 100. Upon receiving the signals from the various sensors 158 of FIG. 1, the controller 152 processes the received signals, and employs actuators 160 in the hydraulic power unit 100 to control operation thereof. For example, the controller 152 may receive a motor speed adjustment request signal indicative of a command for motor speed adjustment. In response, the controller 152 may command operation of the motor 110 to adjust (e.g., increase or decrease) the motor speed based on the request. The other controllable components in the hydraulic power unit may function in a similar manner. An input device 162 is in electronic communication with the controller 152 and generates signals indicative of the user's intent for hydraulic power unit control.

An axis system is provided in FIG. 1, as well as FIGS. 2-14 for reference. The z-axis may be a vertical axis (e.g., parallel to a gravitational axis), the x-axis may be a lateral axis (e.g., horizontal axis), and the y-axis may be a longitudinal axis, in one example. However, in other examples, the axes may have other orientations.

Figure 2:
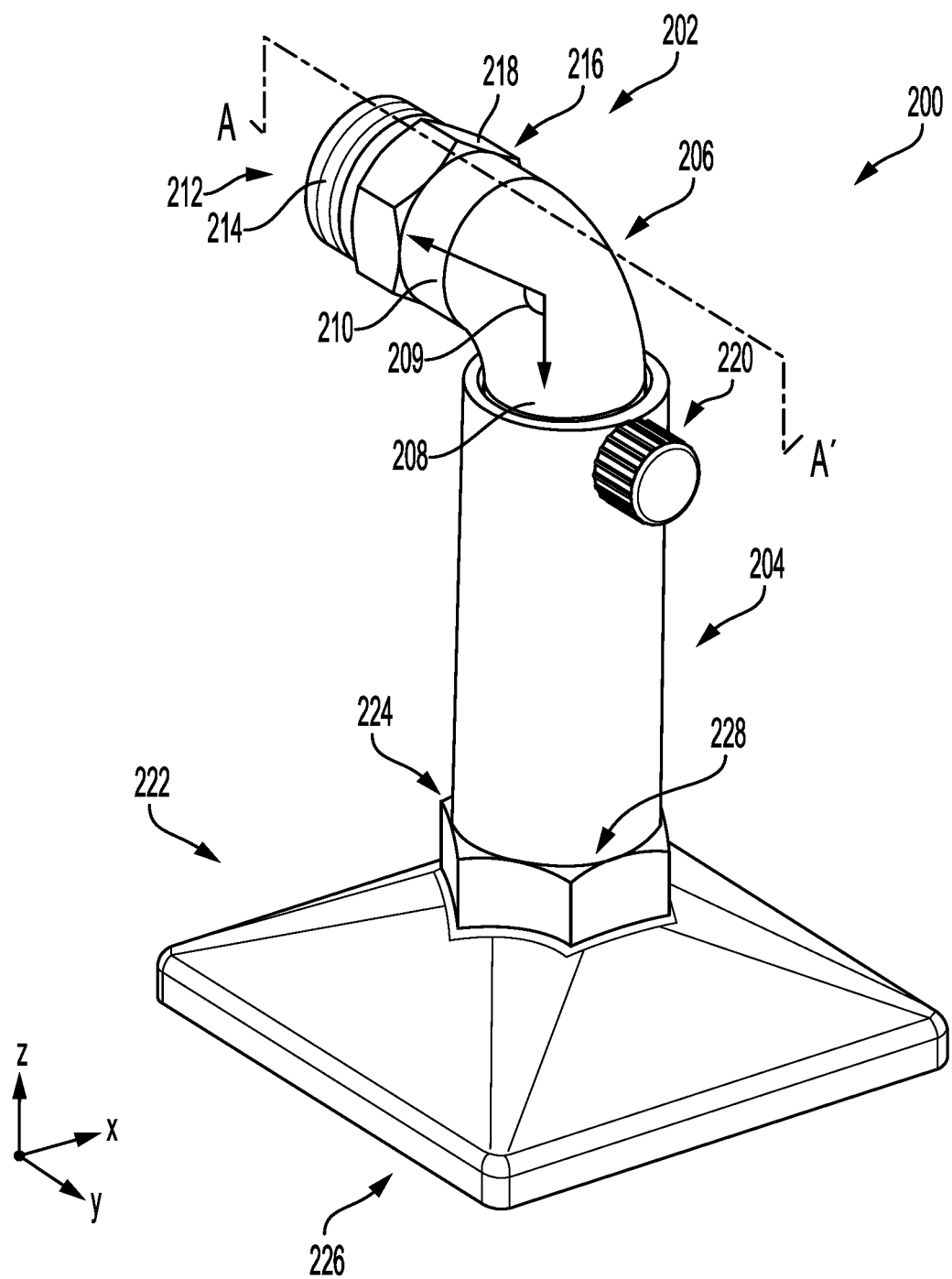
FIG. 2 is an assembled view of a first example of a telescopic pipe assembly.

FIG. 2 shows a detailed example of a telescopic pipe assembly 200 (e.g., a telescopic suction pipe assembly). The telescopic pipe assembly 200 includes a first pipe 202 (e.g., an inner pipe or fitting) and a second pipe 204 (e.g., an outer pipe). The first pipe 202 is axially moveable in relation to the second pipe 204. The first pipe 202 may include multiple indents 300, shown in FIG. 3. Alternatively, the first pipe may include multiple circumferential recesses (e.g., grooves). The circular recess embodiment of the pipe is expanded upon herein with regard to FIGS. 6-11.

Continuing with FIG. 2, the first pipe 202 includes a bend 206. To elaborate, in the first pipe, an upstream section 208 is arranged at an angle 209 in relation to a downstream section 210. The angle 209 may be 90° in one specific example. However, a variety of angles are possible, such as any angle in the range of 10°-170°, for instance. Alternatively, the first pipe may be straight as elaborated upon herein in relation to FIGS. 12-13.

In the illustrated example, the first pipe 202 includes an outlet 212 with a seal 214 for sealing the pipe when it is coupled to the pump inlet, in the illustrated example. However, the seal may be omitted from the pipe assembly, in other examples. Further, in the illustrated example, the first pipe 202 includes a tooling interface 216. To elaborate, the tooling interface 216 is in the form of polygonal faces 218 which may be manipulated by a wrench, for instance.

Further, FIG. 2 shows the first pipe 202 is mated with the second pipe 204. In this way, the pipes are axially moveable with regard to one another, as indicated above. An attachment device 220 which is depicted as a screw in FIG. 2, fixes the relative positon of the first pipe 202 and the second pipe 204 in the illustrated example. The attachment device 220 is elaborated upon herein with regard to FIGS. 3 and 5.

The telescopic pipe assembly 200 includes a filter 222, in the illustrated example. To expound, the filter 222 is positioned at an inlet 224 of the second pipe 204. The filter 222 may be tapered from an inlet 226 to an outlet 228 to increase the amount of unwanted particulates that the filter can capture. However, other filter contours are possible. Cutting plane A-A' denotes the cross-sectional view, depicted in FIG. 5.

Figure 3:
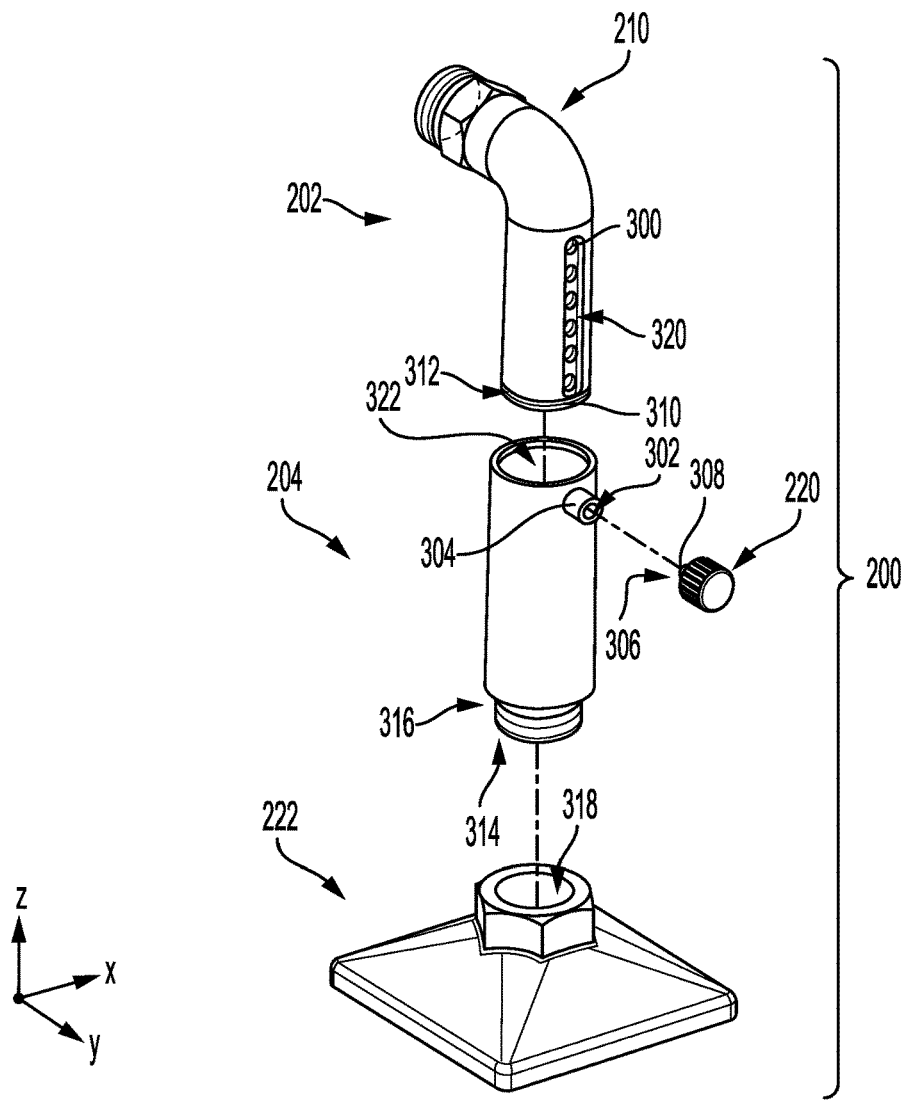
FIG. 3 is an exploded view of the telescopic pipe assembly, depicted in FIG. 1.

FIG. 3 shows an exploded view of the telescopic pipe assembly 200. The first pipe 202, the second pipe 204, the attachment device 220, and the filter 222 are again illustrated. The second pipe 204 is shown including an alignment opening 302. Further, in the illustrated example, threads 304 circumferentially surround the alignment opening. However, the second pipe 204 may have an alternate interface for the attachment device in alternate configurations.

In the illustrated example, threads 306 in the interior of the attachment device 220 are contoured to engage the threads 304 in the second pipe 204. When the attachment device 220 is threaded with the second pipe 204 an extension 308 of the attachment device (depicted in FIG. 5) mates with the alignment opening 302 and one of the indents 300 to fix the position of the pipes 202, 204. In this way, the position of the first and second pipes 202, 204 is able to be securely fixed.

FIG. 3 shows an upstream end of the first pipe 202 with a seal 310 (e.g., an O-ring) positioned in a recess 312. The seal 310 allows the chance of fluid leaks at the mated interface between the first and the second pipes 202, 204 to be reduced.

The upstream end 314 of the second pipe 204 may include a reduced diameter section 316 which mates with an opening 318 in the filter 222 when the pipe assembly is assembled. To elaborate, the reduced diameter section 316 may be press-fit into the filter opening 318 when the pipe assembly is assembled.

The indents 300 in the first pipe 202 are arranged along a length of the downstream section 210 in the illustrated example. To expound, the indents 300 may be positioned in a recess 320 on the outer surface of the first pipe 202. Further, it will be appreciated that the indents 300 are similarly shaped and sized, in the illustrated example. The alignment opening 302 is positioned at a downstream end 322 of the second pipe 204 in the illustrated example. However, the alignment opening may be positioned at a lower position, in other examples.

Figure 4:
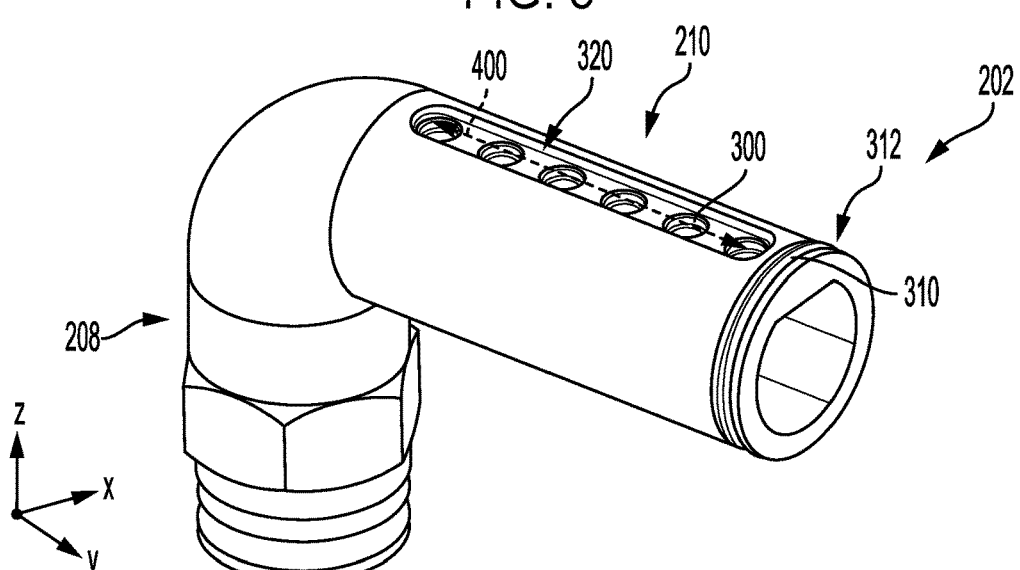
FIG. 4 is a detailed view of a pipe in the telescopic pipe assembly, depicted in FIG. 1.

FIG. 4 shows a detailed view of the first pipe 202. The indents 300 are again shown along with the upstream section 208 and the downstream section 210 of the first pipe 202. Further, the seal 310 is again shown arranged in the recess 312 of the first pipe 202. In the illustrated example, the indents 300 are aligned along an axis 400 which is parallel to the axis 504 shown in FIG. 5 and discussed in greater detail herein. Further, in the example depicted in FIG. 4, the indents 300 are positioned in the recess 320 in the outer surface of the first pipe 202, as previously indicated. In this way, the first pipe 202 may be more effectively mated with second pipe 204 and slid within the second pipe with less friction.

Figure 5:
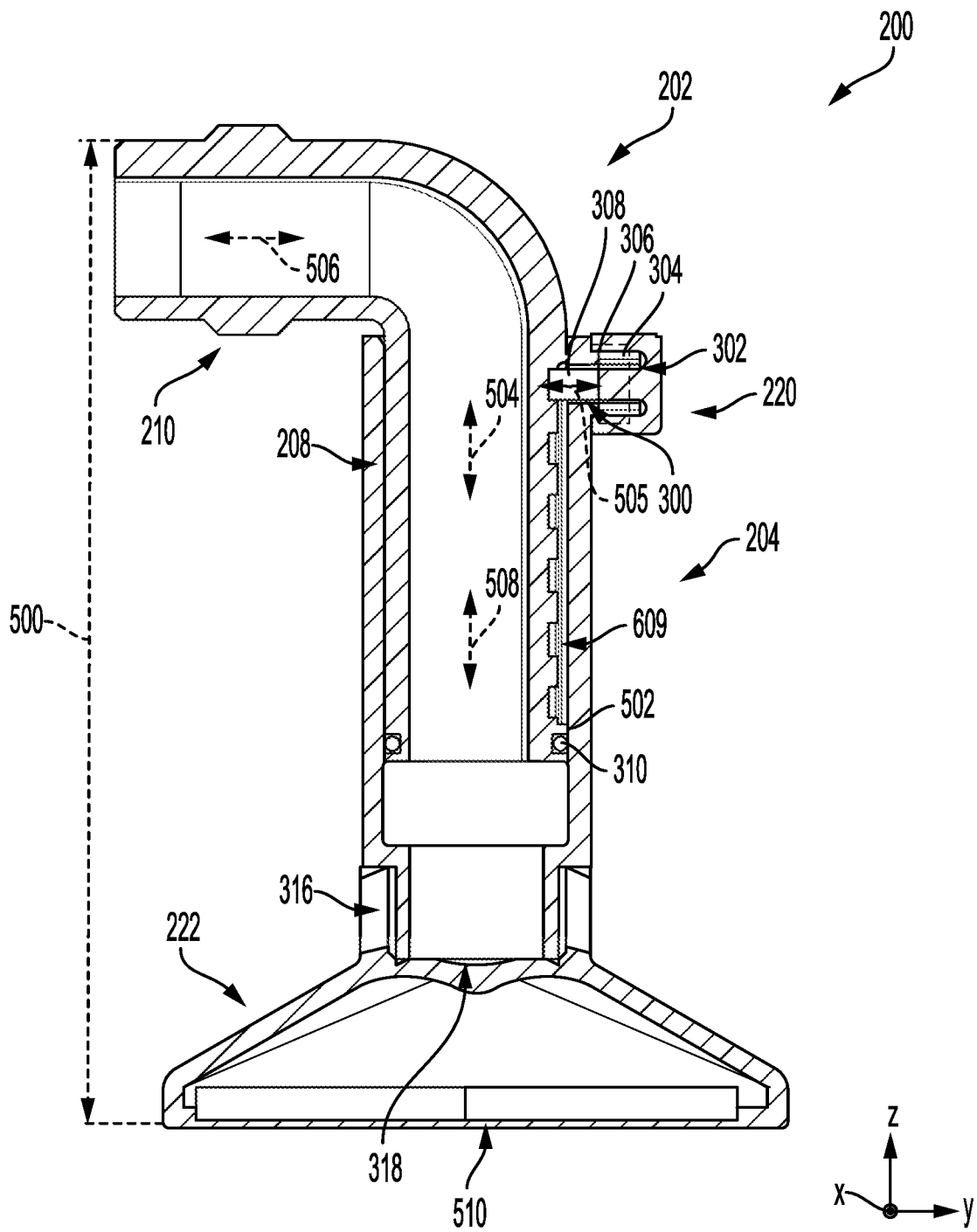
FIG. 5 is a cross-sectional view of the telescopic pipe assembly, depicted in FIG. 1.

FIG. 5 shows a cross-sectional view of the telescopic pipe assembly 200. The first pipe 202, the second pipe 204, the attachment device 220, and the filter 222 are again illustrated in FIG. 5.

The extension 308 of the attachment device 220 is shown mating with the alignment opening 302 and one of the indents 300. Threads 306 in the attachment device 220 are shown engaged with threads 304 in the second pipe 204. In this way, the attachment device 220 is able to be secured to the second pipe to temporarily fix the relative position of the first pipe 202 and the second pipe 204. In this way, the pipe assembly's length is able to be efficiently adjusted to fit differently sized hydraulic power units.

It will be appreciated that to adjust the length 500 of the telescopic pipe assembly 200, a user may unthread or otherwise remove the attachment device 220 from the second pipe 204 and then pull the attachment device radially outward. In this way, the pipe assembly 200 is placed in a configuration where the first pipe 202 is axially slideable in relation to the second pipe 204 or vice versa. To adjust the length of the telescopic pipe assembly 200, the user may then slide the first pipe 202 in relation to the second pipe 204 or vice versa to achieve a desired length where the alignment opening 302 is aligned with another one of the indents 300. The user then is able to thread the attachment device 220 onto the threaded section 304 in the second pipe 204 such that the extension 308 mates with the alignment opening 302 and one of the indents 300 which has been selected by the user. In this way, the length of the pipe assembly is able to be efficiently adjusted, allowing the assembly's adaptability to be increased. In other words, the length of the pipe assembly is able to be fixed at discrete positons, allowing the pipe assembly to be incorporated into hydraulic power units with a variety of geometries due to the increased adaptability.

As shown in FIG. 5, the seal 310 is in face sharing contact with an interior surface 502 of the second pipe 204. In this way, leaks from the pipe assembly are reduced or altogether avoided.

A central axis 504 of the upstream section 208 and a central axis 506 of the downstream section 210 are depicted FIG. 5. As discussed above, these central axes are angled in relation to one another, in the illustrated example. However, these central axes may be coaxially arranged, as discussed in greater detail herein in relation to FIGS. 12-13. Further, the central axis 504 is arranged coaxial to a central axis 508 of the second pipe 204. A central axis 505 of the extension 308 may be radially aligned with regard to the central axis 504. In this way, the extension may be shaped to retain the pipes in a desired alignment.

FIG. 5 further shows the reduced diameter section 316 of the second pipe 204 mated with the filter opening 318. A filter inlet 510 which may be fluidly coupled (e.g., directly fluidly coupled) to a tank outlet is further depicted in FIG. 5.

Figures 6, 7:
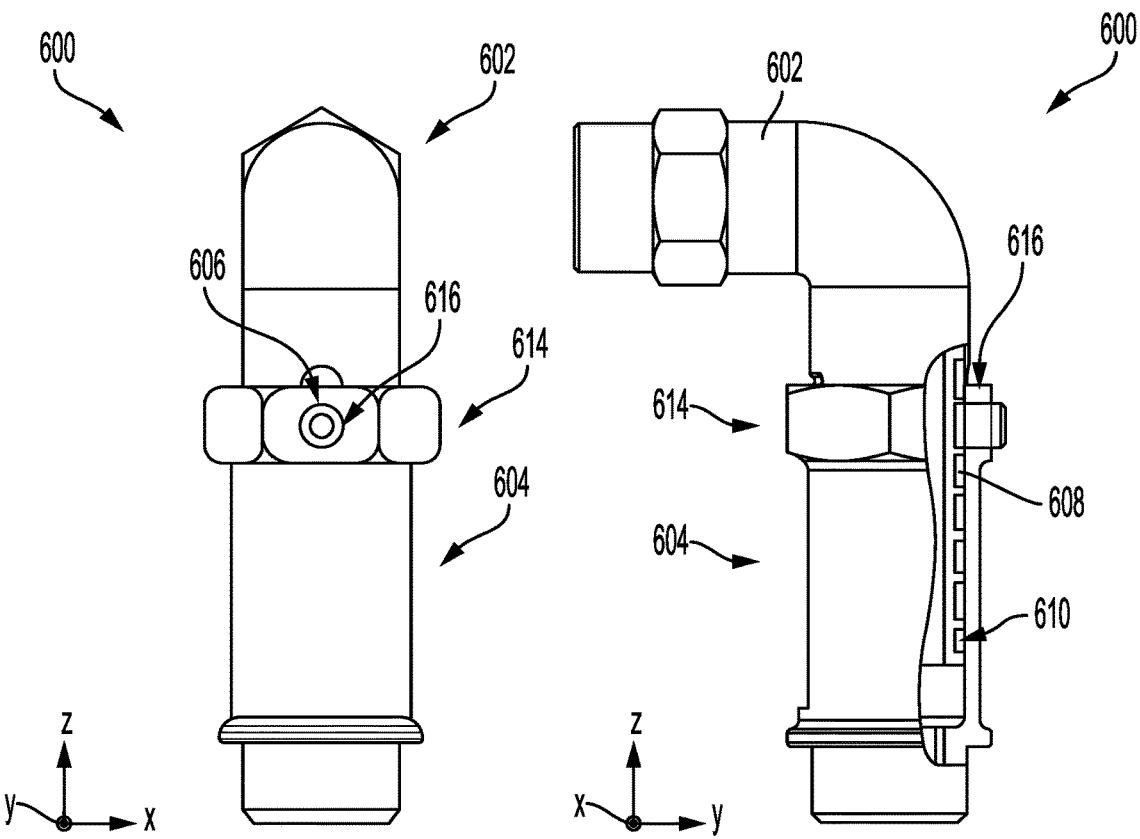
FIGS. 6-8 are different views of a second example of a telescopic pipe assembly with a bent configuration.
Figure 8:
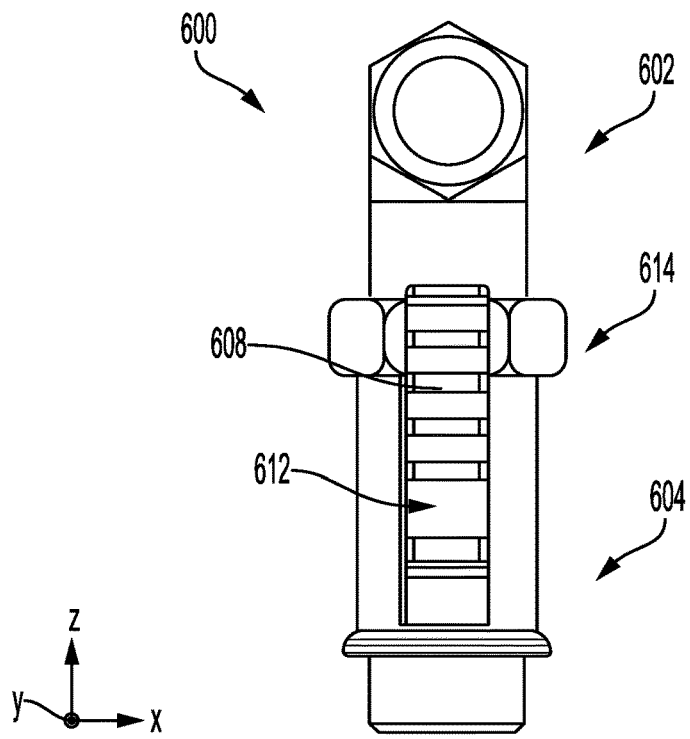

FIGS. 6-8 show another example of a telescopic pipe assembly 600 which again includes a first pipe 602, a second pipe 604, and an attachment device 606. The telescopic pipe assembly 600 includes some features which are similar to the telescopic pipe assembly 200 depicted in FIGS. 2-5. Redundant description of the overlapping features is omitted for brevity. However, in the telescopic pipe assembly 600, the first pipe 602 includes multiple recesses 608 (e.g., grooves). The recesses 608 at least partially circumferentially extend around the first pipe 602. Specifically, in the illustrated example, the recesses 608 may be positioned on an outboard side 609 of the first pipe. Thus, the recesses 608 may solely extend around a portion of the first pipe. To elaborate, the recesses 608 may function to more precisely define the position of the second pipe 604 with respect to the first pipe 602 and allow for more effective relative movement between the two pipes by reducing friction.

A seal 610 may again be provided at the interface between the first and second pipes 602, 604. The seal 610 is positioned below the recesses 608. The second pipe 604 may include a cut-out 612 and/or a tooling interface 614. The cut-out 612 may allow the user to more efficiently align a desired one of the recesses with an alignment opening 616 in the second pipe 604.

The alignment opening 616 in the second pipe 604 is shown positioned in the tooling interface 614 in the illustrated example. The attachment device 606 is shown extending through the alignment opening 616 and into one of the recesses 608. In this way, the relative position of the first pipe 602 and the second pipe 604 may be user-selectively fixed.

Figure 9:
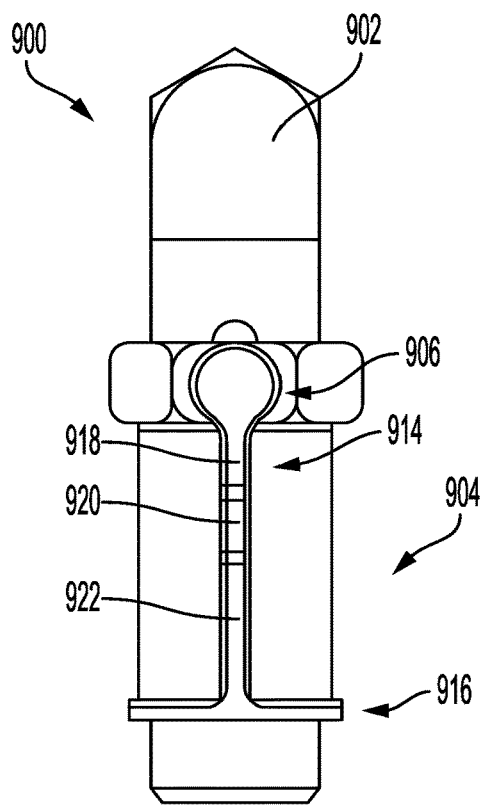
FIGS. 9-11 are different views of a third example of a telescopic pipe assembly with a bent configuration.
Figure 10:
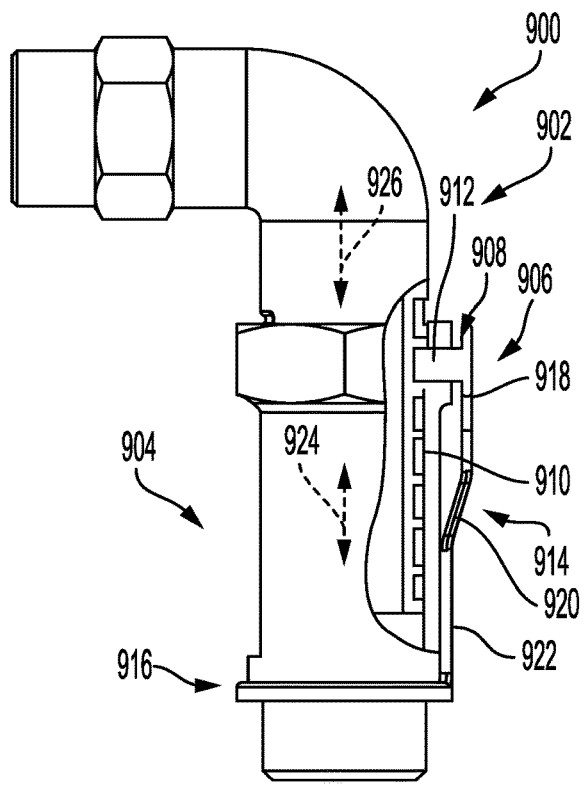
Figure 11:
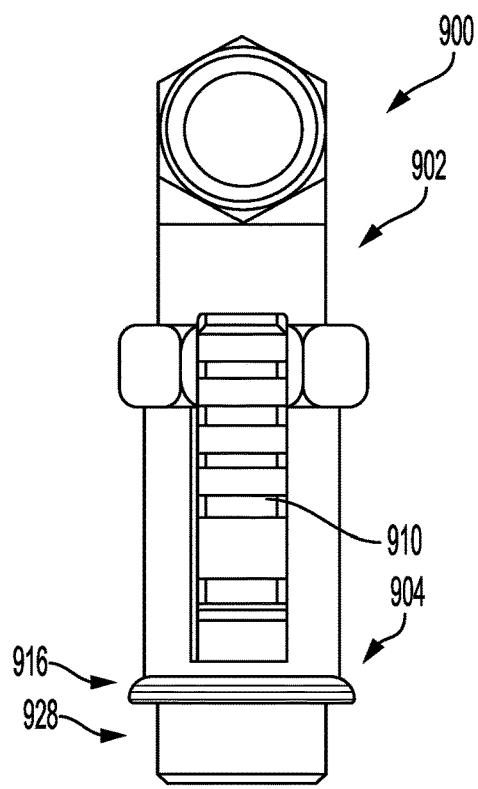

FIGS. 9-11 show yet another example of a telescopic pipe assembly 900 which again includes a first pipe 902, a second pipe 904, and an attachment device 906. The second pipe 904 again includes an alignment opening 908 and the first pipe 902 again include recesses 910. However, the telescopic pipe assembly 900 depicted in FIGS. 9-11 includes the attachment device 906 in the form of a hooked apparatus. To elaborate, the hooked apparatus 906 includes an extension 912 that mates with the alignment opening 908 and one of the recesses 910. The hooked apparatus 906 further includes a support member 914 that is directly coupled to the extension 912 and a base 916 which is coupled to the second pipe 904, in the illustrated example. The support member 914 may be flexible to allow the extension 912 to be efficiently mated and decoupled from the opening 908.

The support member 914 may be conceptually divided into a first section 918, a second section 920, and a third section 922. In the illustrated example, the extension 912 directly extends from the first section 918. To elaborate, the extension may extend at an angle (e.g., a perpendicular angle) in relation to the first section 918. The second section 920 may be angled towards a central axis 924 of the second pipe 904. The third section 922 is directly coupled to the base 916. In this way, the support member may be designed to enable the hooked apparatus 906 to effectively fix the relative positions of the two pipes at a desired length.

The support member 914 flexes to allow radial movement of the extension 912 with regard to a central axis 926 of the first pipe 902 to allow the positon of the pipes to be selectively fixed to accommodate for length adjustment of the pipe assembly 900. The base 916 of the hooked apparatus 906 may mate with the outer circumference of the second pipe 904 in a reduced diameter section 928 to fix the position of the hooked apparatus 906 in relation the second pipe 904. In this manner, the extension 912 in the hooked apparatus 906 may align with the alignment opening 908 and the recesses 910 in a desired manner.

Figure 12:
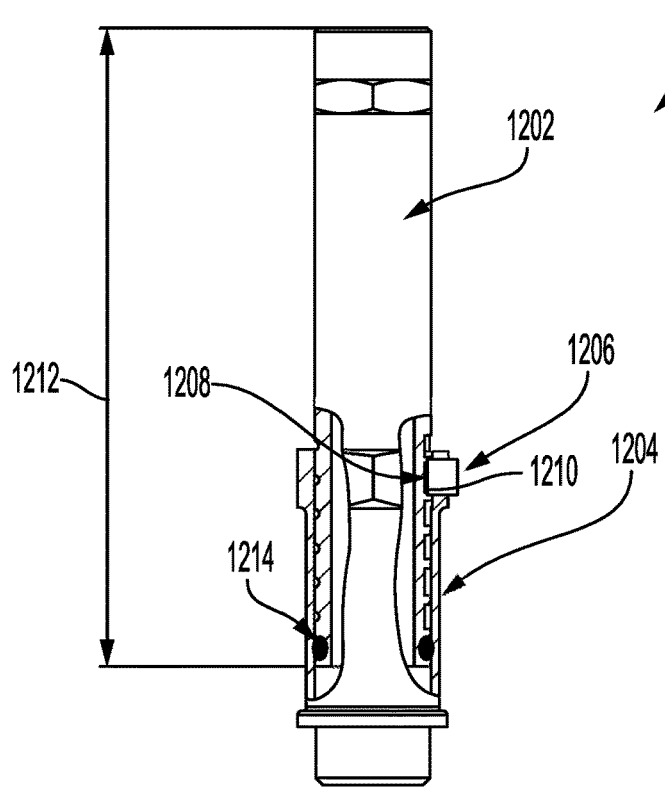
FIG. 12 is a side view of a fourth example of a telescopic pipe assembly with a straight configuration.

FIG. 12 shows yet another example of a telescopic pipe assembly 1200 with a first pipe 1202 and a second pipe 1204. As shown in FIG. 12 the first pipe 1202 is arranged coaxial to the second pipe 1204. Further, the telescopic pipe assembly 1200 includes a screw 1206 mated with an alignment opening 1208 and a recess 1210, similar to the telescopic pipe assembly 600 depicted in FIGS. 6-8. Redundant description of these overlapping components is omitted for concision. It will be understood, that the length 1212 of the pipe assembly 1200 is able to be efficiently adjusted by a user via unscrewing the screw 1206, aligning the alignment opening with another recess, and then re-engaging the screw with the aligned recess. The pipe assembly 1200 again includes a seal 1214.

Figure 13:
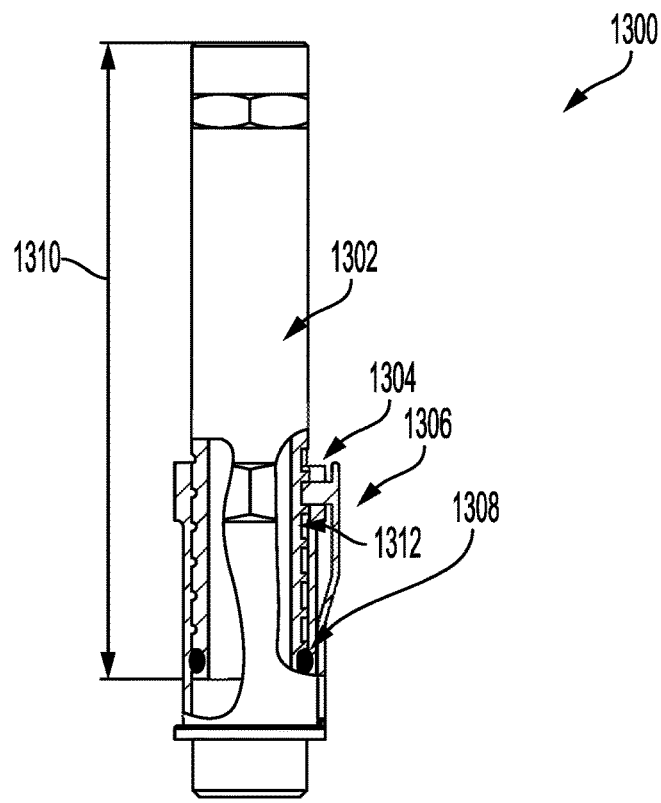
FIG. 13 is a side view of a fifth example of a telescopic pipe assembly with a straight configuration.

FIG. 13 shows yet another example of a telescopic pipe assembly 1300 with a first pipe 1302 and a second pipe 1304. As shown in FIG. 13, the first pipe 1302 is arranged coaxial to the second pipe 1304. Further, the telescopic pipe assembly 1300 includes a hooked apparatus 1306 similar to the hooked apparatus 906 shown in FIGS. 9-11. FIG. 13 shows the telescopic pipe assembly 1300 further including a seal 1308. Additionally, the length 1310 of the pipe assembly 1300 is again configured for efficient adjustment via the hooked apparatus 906 and the recesses 1312.

Figure 14:
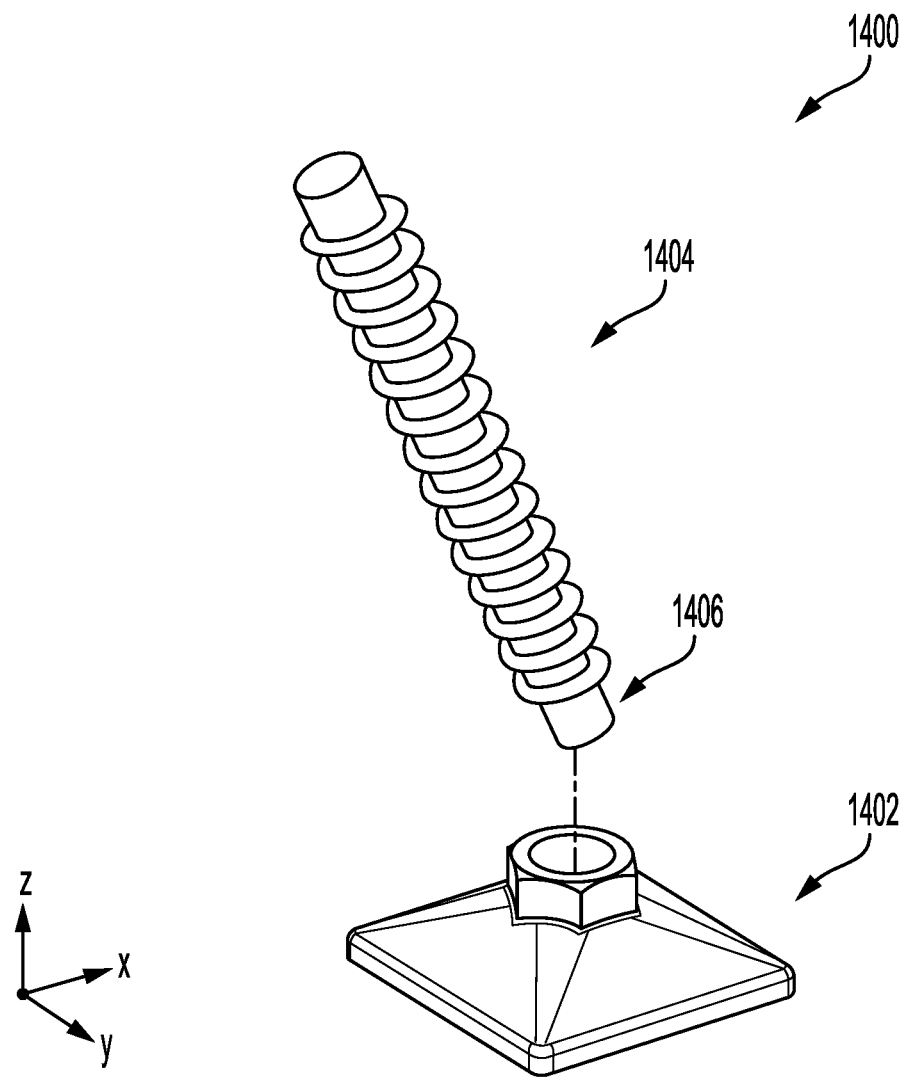
FIG. 14 shows a sixth example of a telescopic pipe assembly.

FIG. 14 show another example of a telescopic pipe assembly 1400. The telescopic pipe assembly 1400 again includes a filter 1402 and a pipe 1404. The filter 1402 has a similar construction to the other filters described herein. Therefore, redundant description of the features of the filter 1402 is omitted for brevity. The pipe 1404 is capable of being mounted in either a horizontal or vertical position due to the accordion construction of the pipe. To elaborate, the accordion pipe 1404 is length adjustable and has the capability of being arranged in a straight or a bent configuration, thereby increasing the pipe assembly's adaptability. Therefore, the pipe assembly 1400 is capable of being incorporated into a wide variety of hydraulic power units, thereby increasing the pipe assembly's customer appeal. The pipe 1404 includes a reduced diameter section 1406 which mates with the filter. The other end of the pipe 1404 similarly includes a reduced diameter section.

FIGS. 1-14 are drawn approximately to scale aside from the schematically depicted components, although the components may have other relative dimensions, in other embodiments.

FIGS. 1-14 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention is further described in the following paragraphs. In one aspect, a telescopic pipe assembly in a hydraulic power unit is provided that comprises a first pipe comprising a plurality of indents or recesses that are positioned along a portion of the first pipe; a second pipe comprising an alignment opening, wherein the first pipe is axially moveable in relation to the second pipe and wherein the alignment opening is configured to align with each of the plurality of indents or recesses in multiple axial positions; and an attachment device configured to extend through the alignment opening and user-selectably mate with one of the plurality of indents or recesses to fix an axial position of the first pipe in relation to the second pipe. In one example, the plurality of indents may be aligned along an axis which is parallel to a central axis of a section of the first pipe. In another example, the pipe assembly may further comprise a seal positioned at an interface between the first pipe and the second pipe. In another example, the attachment device may be a screw that threadingly engages threads which circumferentially surround the alignment opening. In yet another example, the attachment device may be a hooked apparatus that may include: an extension that mates with the alignment opening and the plurality of indents or recesses; and a support member that is directly coupled to the extension and a base which is coupled to the second pipe. In yet another example, the first pipe may be straight. In another example, the first pipe may include an angled bend. In another example, the pipe assembly may further comprise an oil filter is mated with an upstream end of the second pipe. In another example, the second pipe may include a threaded extension that theadingly engages a threaded section of the attachment device. In yet another example, the plurality of recesses may circumferentially extend around the first pipe. In one example, the support member may be flexible.

In another aspect, a telescopic suction pipe assembly for a hydraulic power unit is provided that comprises a first pipe comprising a plurality of indents or recesses that are positioned along a portion of the first pipe; a second pipe comprising an alignment opening, wherein the first pipe is axially moveable in relation to the second pipe and wherein the alignment opening is configured to align with each of the plurality of indents or recesses in multiple axial positions; an attachment device configured to extend through the alignment opening and user-selectably mate with one of the plurality of indents or recesses to fix an axial position of the first pipe in relation to the second pipe; a seal positioned at an interface between the first pipe and the second pipe; and a filter coupled to an upstream end of the second pipe. In one example, the first pipe may be straight along its length from a first end to a second end; or the first pipe may include a 90° bend. In another example, the attachment device may be a screw that threadingly engages threads in the second pipe. In yet another example, the attachment device may be a hooked apparatus that includes an extension that mates with the alignment opening and the plurality of indents or recesses. In another example, the hooked apparatus may include a flexible support member that is directly coupled to the extension and a base which at least partially circumferentially surrounds the second pipe. In another example, the plurality of indents may be aligned along an axis which is parallel to a central axis of a section of the first pipe; and the plurality of indents may be positioned in an exterior recess of the first pipe.

In another aspect, a hydraulic power unit is provided that comprises a telescopic suction pipe assembly comprising: a first pipe comprising a plurality of indents that are positioned along a portion of the first pipe; a second pipe comprising an alignment opening, wherein the first pipe is axially moveable in relation to the second pipe and wherein the alignment opening is configured to align with each of the plurality of indents in multiple axial positions; an attachment device configured to extend through the alignment opening and user-selectably mate with one of the plurality of indents to fix an axial position of the first pipe in relation to the second pipe; and a filter coupled to an upstream end of the second pipe; a tank fluidly coupled the filter; and a pump fluidly coupled to a downstream end of the first pipe. In one example, the attachment device may be a threaded screw or a hooked apparatus. In another example, the hydraulic power unit forms a monolithic unit. In yet another example, the plurality of indents may be aligned along an axis which is parallel to a central axis of a section of the first pipe; or the plurality of recesses may circumferentially extend around the first pipe.

While various embodiments have been described above, it should be understood that they have been presented by way of example, and not limitation nor restriction. It will be appreciated that the configurations and routines disclosed herein are exemplary in nature, and that these specific examples are not to be considered in a limiting sense, because numerous variations are possible. For example, the above technology can be applied to different types of hydraulic power units. The subject matter of the present disclosure includes all novel and non-obvious combinations and sub-combinations of the various systems and configurations, and other features, functions, and/or properties disclosed herein. It will be apparent to persons skilled in the relevant arts that the disclosed subject matter may be embodied in other specific forms without departing from the spirit of the subject matter.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

As used herein, the term "approximately" is construed to mean plus or minus one percent of the range, unless otherwise specified.

The invention claimed is:

1. A telescopic pipe assembly in a hydraulic power unit, comprising:
   a first pipe comprising a plurality of indents or recesses that are positioned along a portion of the first pipe;
   a second pipe comprising an alignment opening, wherein the first pipe is axially moveable in relation to the second pipe and wherein the alignment opening is configured to align with each of the plurality of indents or recesses in multiple axial positions; and
   an attachment device configured to extend through the alignment opening and user-selectably mate with one of the plurality of indents or recesses to fix an axial position of the first pipe in relation to the second pipe.

2. The telescopic pipe assembly of claim 1, wherein the plurality of indents are aligned along an axis which is parallel to a central axis of a section of the first pipe.

3. The telescopic pipe assembly of claim 1, further comprising a seal positioned at an interface between the first pipe and the second pipe.

4. The telescopic pipe assembly of claim 1, wherein the attachment device is a screw that threadingly engages threads which circumferentially surround the alignment opening.

5. The telescopic pipe assembly of claim 1, wherein the attachment device is a hooked apparatus that includes:
   an extension that mates with the alignment opening and the plurality of indents or recesses; and
   a support member that is directly coupled to the extension and a base which is coupled to the second pipe.

6. The telescopic pipe assembly of claim 5, wherein the support member is flexible.

7. The telescopic pipe assembly of claim 1, wherein the first pipe is straight.

8. The telescopic pipe assembly of claim 1, wherein the first pipe includes an angled bend.

9. The telescopic pipe assembly of claim 1, further comprising an oil filter mated with an upstream end of the second pipe.

10. The telescopic pipe assembly of claim 1, wherein the second pipe includes a threaded extension that threadingly engages a threaded section of the attachment device.

11. A hydraulic power unit, comprising:
a telescopic suction pipe assembly comprising:
   a first pipe comprising a plurality of indents or recesses that are positioned along a portion of the first pipe;
   a second pipe comprising an alignment opening, wherein the first pipe is axially moveable in relation to the second pipe and wherein the alignment opening is configured to align with each of the plurality of indents or recesses in multiple axial positions;
   an attachment device configured to extend through the alignment opening and user-selectably mate with one of the plurality of indents or recesses to fix an axial position of the first pipe in relation to the second pipe; and
a filter coupled to an upstream end of the second pipe;
a tank fluidly coupled the filter; and
a pump fluidly coupled to a downstream end of the first pipe.

12. The hydraulic power unit of claim 11, wherein the attachment device is a threaded screw or a hooked apparatus.

13. The hydraulic power unit of claim 11, further comprising a seal positioned at an interface between the first pipe and the second pipe.

14. The hydraulic power unit of claim 11, wherein:
the plurality of indents are aligned along an axis which is parallel to a central axis of a section of the first pipe.

* * * * *